Figures 1, 2:
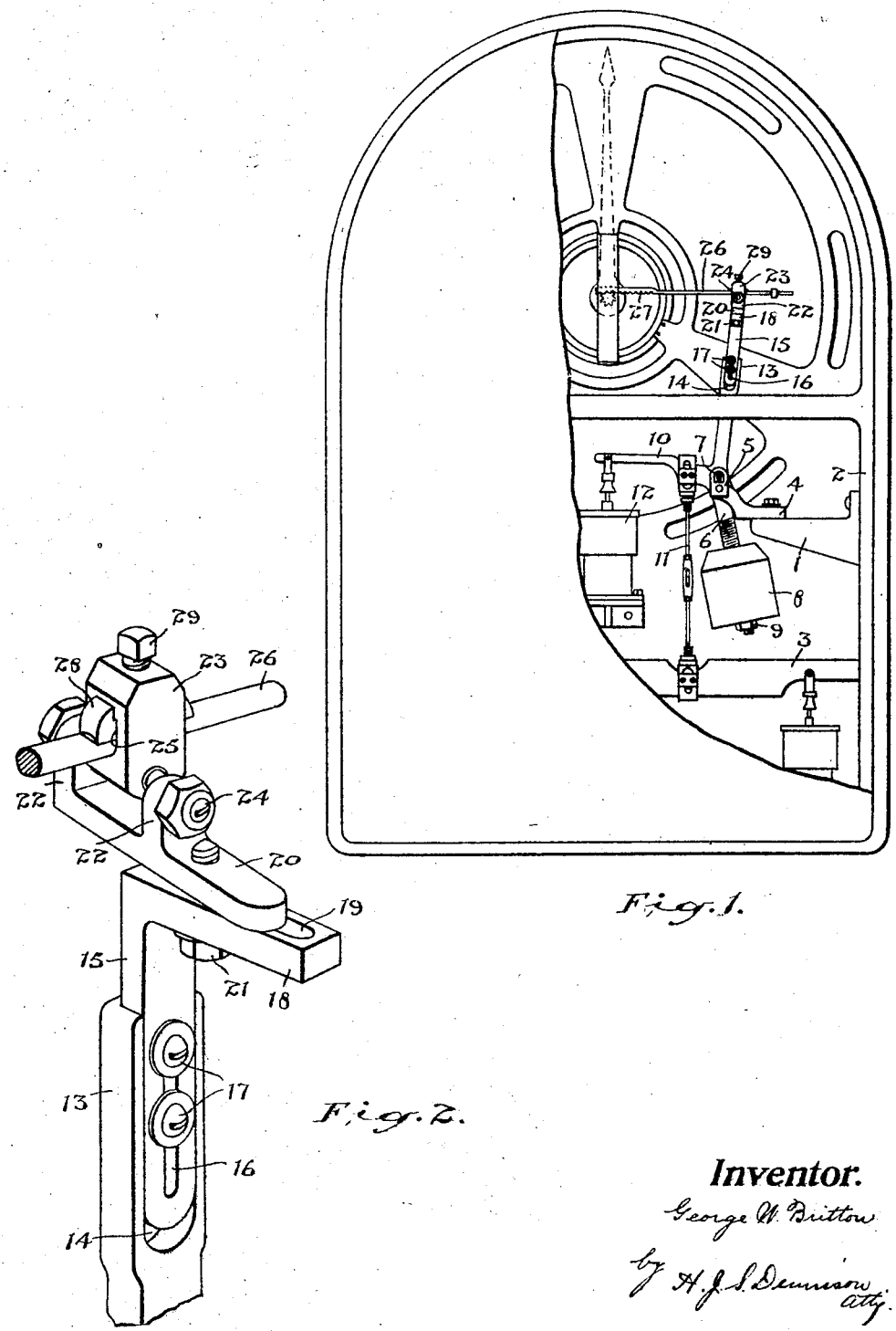

May 24, 1927. 1,629,474

G. W. BRITTON

SCALE BEAM MECHANISM

Filed May 13, 1925

Inventor.
George W. Britton
by H. J. S. Dennison
Atty.

Patented May 24, 1927.

1,629,474

UNITED STATES PATENT OFFICE.

GEORGE W. BRITTON, OF HAMILTON, ONTARIO, CANADA, ASSIGNOR TO JAMES P. STEEDMAN, OF HAMILTON, CANADA.

SCALE-BEAM MECHANISM.

Application filed May 13, 1925. Serial No. 30,126.

The principal objects of the invention are, to enable a very accurate adjustment of the translating mechanism, and to devise a mechanism for connecting the scale beam with the registering finger which will be extremely accurate and will be of simple and inexpensve construction.

The principal feature of the invention consists in the novel construction and arrangement of the pendulum and its operating connection with the indicating finger, whereby the pendulum supported in a low down position is provided with a universally adjustable connection with the indicating finger operating member and the balance weight of the pendulum is supported on a threaded adjustment.

In the drawings, Figure 1 is an elevational view of the interior mechanism of a dial scale constructed in accordance with this invention.

Figure 2 is an enlarged perspective detail of the universally adjustable connection between the pendulum and the dial indicating finger.

On reference to the accompanying drawing, the pendulum supporting bracket 1 secured to the inner side of the frame 2 is arranged a short distance above the scale beam 3.

Upon the outer end of the bracket 1 is adjustably supported a forked bracket 4 carrying bearing blocks 5.

The pendulum 6 is in the from of an angle-shaped arm having the knife edge bearing supports 7 resting upon the blocks 5 in the bracket 4.

The lower end of the pendulum is round and is threaded and upon it is threaded the pendulum weight 8 which may be very accurately adjusted toward or from the pivots and it is secured in its adjustable position by the lock nut 9 threaded on the lower end.

An arm 10 extends laterally from the pivots 7 of the pendulum and carries suitable pivot connections (not shown) to which the adjustable shackle connection 11 connecting the pendulum 6 with the beam 3 is connected.

The arm 10 extends beyond the shackle 11 and is connected to the dash pot 12 which operates to relieve the pendulum from undesirable vibrations.

The upper end 13 of the pendulum is formed with a longitudinal recess 14 having parallel sides and in this recess is slidably arranged an angle bracket 15, the lower end of which is provided with a longitudinal slot 16 through which the fastening screws 17 extend.

The upper end 18 of the bracket 15, which extends rearwardly at right angles to the pendulum is provided with a slot 19.

A member 20 slidably resting upon the top face of the upper end 18 of the angle bracket 15 is secured thereto by the cap screw 21 extending through the slot 19, said member being adjusted pivotally upon the axis of the screw or lengthwise of the bracket.

The member 20 is provided with a pair of upright lugs 22 between which is arranged the block 23 pivotally supported upon the adjustable screw pivots 24 arranged in said lugs.

The block 23 is provided with a transverse orifice 25 through which the rod 26 carrying the indicating operating rack 27 extends.

A key 28 in the block 23 is tightened upon the rod to hold it securely in adjusted positions by a set screw 29.

The rack 27 co-operates with a suitable pinion on the spindle of the indicating finger.

It will be readily understood from this description that there is a very wide range of adjustment provided so that it will not be necessary to accurately machine the frame and bearing supports for the pendulum and beam. Further, it will be seen that the bracket 4 may be adjusted on the bracket 1 and the member 20 may be swung to any desirable angle on the upper supporting bracket 15 or it may be adjusted forwardly or backwardly in relation to the arm and the bracket itself may be adjusted longitudinally on the end of the arm, consequently the operating connection between the pivot of the pendulum and the indicating finger is universally adjustable.

The arrangement of the shackle connection between the beam and the pendulum is such that there is a free operating connection with ample adjustment and the pendulum weight may be adjusted with vernier accuracy.

The result of the features of construction herein set forth are that a very accurate and serviceable scale is produced.

What I claim as my invention is:—

1. In a dial scale, the combination with the beam and a rotatable indicating finger, of a pendulum pivotally mounted, means connecting said pendulum with the beam, a bracket longitudinally adjustable on the pendulum, a member pivotally and slidably supported on said bracket, a rack adjustably carried in said member and operatively connected with the indicating finger.

2. In a dial scale, the combination with the beam and a rotatable indicating finger, of a rigid bracket, a bracket adjustably mounted on said rigid bracket and carrying pivot supports for the pendulum, a pendulum carried on said pivot supports, and a universally adjustable connection arranged between the upper end of the pendulum and the means for operating the indicating finger.

3. In a dial scale, the combination with the beam and a rotatable indicating finger, of a pendulum pivotally mounted and having a universally adjustable connection to the indicating finger, an arm on said pendulum extending outwardly from the pendulum pivot, a dash pot operatively connected with the outer end of said arm and an adjustable shackle connecting the beam with said pendulum arm at a point intermediate of said pivot and dash pot connection.

GEORGE W. BRITTON.